United States Patent
Lee (10) Patent No.: US 9,810,395 B2
(45) Date of Patent: Nov. 7, 2017

(54) VENTILATION APPARATUS OF LAMP MODULE FOR VEHICLES

(71) Applicant: HYUNDAI MOBIS CO., LTD., Seoul (KR)

(72) Inventor: Soo Bong Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/243,796

(22) Filed: Aug. 22, 2016

(65) Prior Publication Data

US 2017/0102119 A1 Apr. 13, 2017

(30) Foreign Application Priority Data

Oct. 7, 2015 (KR) .................. 10-2015-0140799

(51) Int. Cl.
*F21S 8/10* (2006.01)
*B60Q 1/00* (2006.01)

(52) U.S. Cl.
CPC .......... *F21S 48/325* (2013.01); *B60Q 1/0023* (2013.01); *F21S 48/335* (2013.01)

(58) Field of Classification Search
CPC ...... F21S 48/325; F21S 48/335; B60Q 1/0023
USPC .............................. 362/547, 294
See application file for complete search history.

(56) References Cited

U.S. PATENT DOCUMENTS

| | | | | |
|---|---|---|---|---|
| 4,849,865 A * | 7/1989 | Van Duyn | ............. | F21S 48/335 362/294 |
| 4,862,337 A * | 8/1989 | Ohshio | ................. | F21S 48/335 362/294 |
| 7,780,324 B2 * | 8/2010 | Lin | .......................... | F21V 29/30 362/264 |
| 2011/0157910 A1* | 6/2011 | Shen | .................. | B60H 1/00271 362/547 |
| 2011/0310631 A1* | 12/2011 | Davis | ..................... | F21S 48/115 362/547 |
| 2016/0109087 A1* | 4/2016 | Ito | ......................... | F21S 48/335 362/547 |

FOREIGN PATENT DOCUMENTS

| | | | |
|---|---|---|---|
| EP | 2 239 163 | * | 10/2010 |
| JP | 09-245506 A | | 9/1997 |
| JP | 2013-218853 A | | 10/2013 |
| KR | 10-0427891 B1 | | 4/2004 |
| KR | 10-2014-0051665 A | | 5/2014 |

OTHER PUBLICATIONS

Office Action dated Oct. 14, 2016 of corresponding Korean Patent Application No. 10-2015-0140799—6 pages.

* cited by examiner

*Primary Examiner* — Laura Tso
(74) *Attorney, Agent, or Firm* — Knobbe Martens Olson & Bear LLP (57) ABSTRACT

A ventilation apparatus of a lamp module for vehicles may include: a lamp housing; a lamp emitting light through a light transmitting part; a light transmitting lens covering an opening of the lamp housing; an intake hole part formed through the lamp housing, and arranged at one side of the lamp; an exhaust hole part formed through the lamp housing, and arranged at the other side of the lamp; and an exhaust pipe having one side coupled to the lamp housing and connected to the exhaust hole part and the other side connected to an intake part of an engine.

15 Claims, 7 Drawing Sheets

VENTILATION APPARATUS OF LAMP MODULE FOR VEHICLES

CROSS-REFERENCES TO RELATED APPLICATIONS

The present application claims priority to Korean application number 10-2015-0140799, filed on Oct. 7, 2015, which is incorporated by reference in its entirety.

BACKGROUND

The present disclosure relates to a ventilation apparatus of a lamp module for vehicles, and more particularly, to a ventilation apparatus of a lamp module for vehicles, which ventilates the inside of a lamp of a vehicle.

In general, a vehicle includes a variety of lamp modules. The variety of lamp modules include a head lamp and tail lamp for securing visibility in a dark place and a turn indicator for informing surrounding drivers of a lane change, driving direction, or emergency situation.

The related technology is disclosed in Korean Patent No. 10-0427891 published on Apr. 28, 2004, and entitled "Structure of four-lamp head lamp for vehicles".

SUMMARY

Embodiments of the present invention are directed to a ventilation apparatus of a lamp module for vehicles, which is capable of effectively preventing the formation of moisture on a light transmitting lens of the lamp module.

In one embodiment, a ventilation apparatus of a lamp module for vehicles may include: a lamp housing; a lamp installed in the lamp housing, and emitting light through a light transmitting part; a light transmitting lens covering an opening of the lamp housing, and transmitting the light emitted from the light transmitting part; an intake hole part formed through the lamp housing, and arranged at one side of the lamp; an exhaust hole part formed through the lamp housing, and arranged at the other side of the lamp; and an exhaust pipe having one side coupled to the lamp housing and connected to the exhaust hole part and the other side connected to the exhaust hole part. The intake hole part may be arranged at a side surface of the vehicle based on the lamp, and positioned at a higher level than the lamp, and the exhaust hole part may be arranged at the middle of the vehicle based on the lamp, and positioned at a lower level than the lamp.

The lamp may include: a high beam; and a low beam arranged closer to the side surface of the vehicle than the high beam. The intake hole part may be positioned closer to the side surface of the vehicle than the low beam, and the exhaust hole part may be positioned closer to the middle of the vehicle than the high beam.

The intake hole part may be positioned at a higher level than the low beam, and the exhaust hole part may be positioned at a lower level than the high beam.

The lamp housing may include: a housing body including a lamp mounting part on which the lamp is mounted, and having an exhaust pipe connection part to which the exhaust pipe is connected, such that the exhaust pipe connection part communicates with the exhaust hole part; and a base panel including a light transmitting hole through which the light transmitting part is passed, installed on the housing body so as to cover the lamp, and facing the light transmitting lens.

The exhaust pipe connection part may include: an exhaust pipe fitting part which protrudes from the housing body and to which the exhaust pipe is fitted; and a pressurizing part arranged at the circumference of the exhaust pipe fitting part and pressurizing the exhaust pipe against the exhaust pipe fitting part.

The ventilation apparatus may further include: a filter part arranged on an air discharge path formed by the exhaust pipe and the exhaust pipe connection part, and filtering foreign matters and water which are contained in the air.

The exhaust pipe connection part may further include: a water discharge part forming a flow path through which the water filtered by the filter part is discharged.

The housing body may include a mounting guide protruding in a direction parallel to the exhaust pipe connection part, extended along the circumference of the exhaust pipe connection part so as to cover the exhaust pipe connection part, and fitted to an assembling part formed in a carrier of a front end module of a vehicle.

The intake hole part may include: a first intake hole formed in the housing body; and a second intake hole formed in the base panel so as to communicate with the first intake hole, and the exhaust hole part may include: a first exhaust hole formed in the housing body; and a second exhaust hole formed in the base panel so as to communicate with the first exhaust hole.

The intake hole part may further include: an intake packing for sealing the space between the first intake hole and the second intake hole, and the exhaust hole part may further include an exhaust packing for sealing the space between the first exhaust hole and the second exhaust hole.

The exhaust pipe may include: an extension pipe extended from the housing body to an intake part of the engine, and arranged in an engine room having the engine installed therein; and an opening/closing valve installed on the extension pipe and restricting opening/closing of the extended part.

The extension pipe may include: an extended pipe part extended from the housing body to the intake part of the engine; a reinforced pipe part formed at an end of the extended pipe part and having a larger thickness than the extended pipe part; and an assembling stepped part formed at the inner diameter part of the reinforced pipe part and having the exhaust pipe connection part fitted thereto.

The ventilation apparatus may further include: a humidity sensor configured to sense the humidity of the space between the lamp housing and the light transmitting lens; and a controller configured to control the operation of the opening/closing valve according to the humidity measured by the humidity sensor.

The ventilation apparatus may further include: a temperature sensor configured to sense the temperature of the space between the lamp housing and the light transmitting lens; and a controller configured to control the operation of the opening/closing valve according to the temperature measured by the temperature sensor.

THE EXHAUST PIPE MAY INCLUDE A FLEXIBLE HOSE.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

When rainwater or water is introduced into such a lamp module, moisture forms on a light transmitting lens through which light is transmitted, thereby lowering the optical efficiency. When the light transmitting lens is covered with hydrophilic coating, the amount of moisture forming on the light transmitting lens may be reduced to some extent. However, due to tracks caused by water flowing down along the light transmitting lens, light patterns emitted to the outside of the vehicle may not be distributed as preset patterns.

Figure 1:
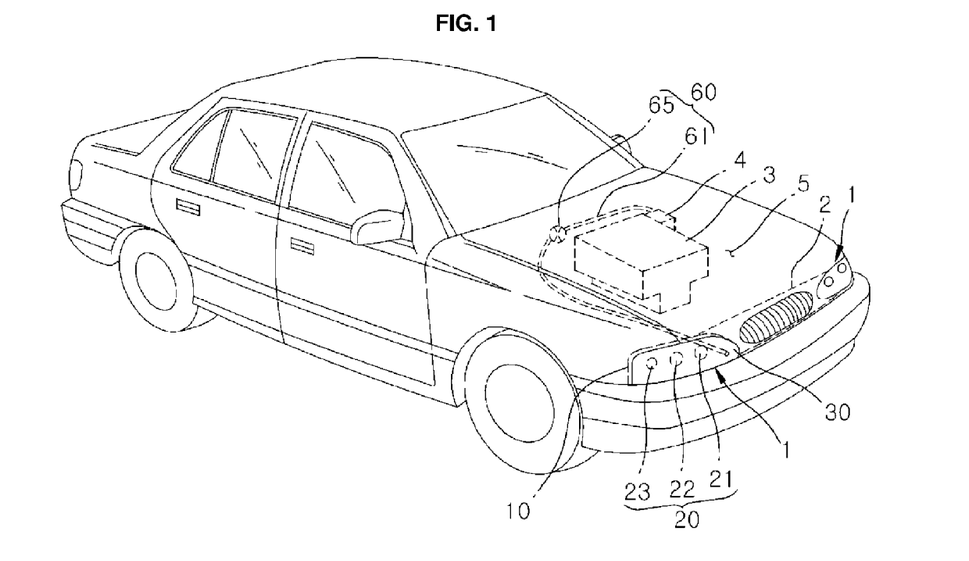
FIG. 1 is a schematic perspective view illustrating a state in which a ventilation apparatus of a lamp module for vehicles in accordance with an embodiment of the present invention is installed.
Figure 2:
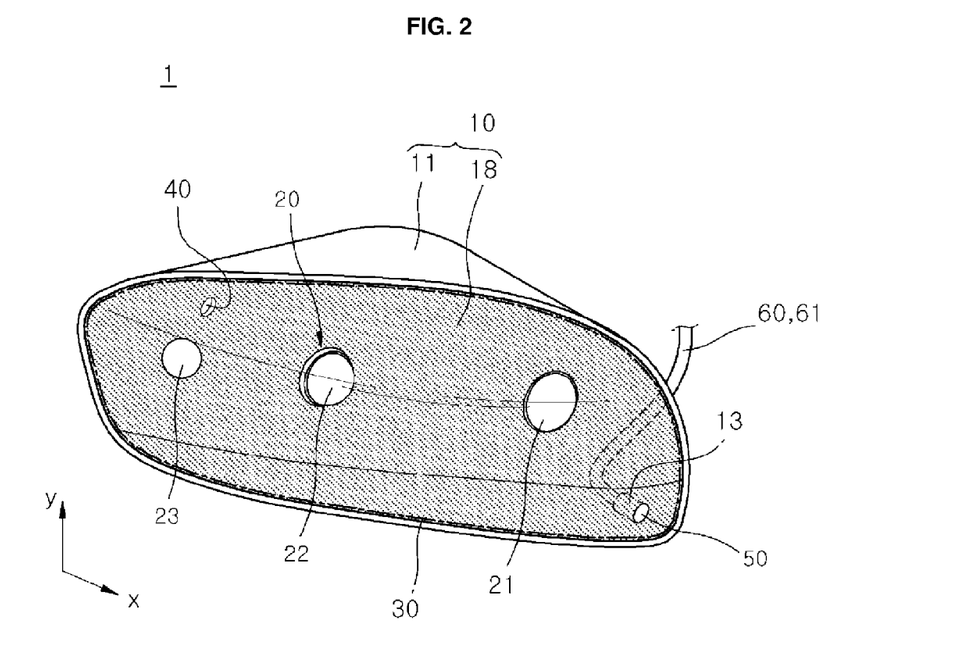
FIG. 2 is a schematic perspective view illustrating the ventilation apparatus of the lamp module for vehicles in accordance with the embodiment of the present invention.

Referring to FIGS. 1 and 2, the ventilation apparatus 1 of the lamp module for vehicles in accordance with the embodiment of the present invention may include a lamp housing 10, a lamp 20, a light transmitting lens 30, an intake hole part 40, an exhaust hole part 50, and an exhaust pipe 60.

The lamp housing 10 may provide a framework for supporting the lamp 20 and related parts at normal positions. The lamp 20 may include a lighting apparatus such as an LED, and be installed in the lamp housing 10. Light generated through the lighting apparatus of the lamp 20 may be emitted to the outside of the lamp 20 through a light transmitting part 24 which covers the lamp 20 and is formed of a transparent material.

The lamp 20 is fixed and installed in the lamp housing 10 in a state where the lamp 20 is inserted and housed in the lamp housing 10 through an opening of the lamp housing 10. The light transmitting lens 30 may be formed of a transparent material through which light can be transmitted, and installed to cover the opening of the lamp housing 10. The light emitted from the lamp 20 through the light transmitting part 24 may be irradiated to the outside of the lamp module while the direction and range of the light is finally determined through the light transmitting lens 30.

The intake hole part 40 is a space formed between the lamp housing 10 and the light transmitting lens 30 and may serve as a path through which air is introduced. The intake hole part 40 may be formed through the lamp housing 10, and arranged at one side close to a side surface of the vehicle, based on the lamp 20. Through the intake hole part 40, the space formed between the lamp housing 10 and the light transmitting lens 30 may communicate with the outside of the lamp housing 10, and thus maintain the atmospheric pressure at all times.

The exhaust hole part 50 may serve as a path through which air existing between the lamp housing 10 and the light transmitting lens 30 is discharged to the outside of the lamp housing 10. The exhaust hole part 50 may be formed through the lamp housing 10, and arranged at the other side close to the center of the vehicle, based on the lamp 20.

Hereafter, the case in which the lamp 20 is applied to a head lamp which is installed to irradiate light forward as illustrated in FIG. 1, or specifically the case in which the lamp 20 is applied to a right head lamp positioned at the right side based on the traveling direction of the vehicle will be taken as an example for description. FIG. 2 is a front view of the right head lamp. In FIG. 2, the left side corresponds to the right side of the vehicle, based on the traveling direction thereof.

While the air is discharged through the exhaust hole part 50, the space between the lamp housing 10 and the light transmitting lens 30 may be ventilated. Thus, water introduced in the lamp housing 10 may be naturally discharged to the outside of the lamp housing 10, and simultaneously dried by the air flow passed between the lamp housing 10 and the light transmitting lens 30.

At this time, since the air flow sweeps the inner surface of the light transmitting lens 30 on which water mainly forms, the water forming on the light transmitting lens 30 may be more effectively discharged and removed.

The exhaust pipe 60 may serve as a discharge path of air outside the lamp housing 10, while extended from the lamp housing 10 to an intake part 4 of an engine 3. The intake part 4 of the engine 3 may include a path through which air is introduced into the engine 3 or an intake device for introducing air into the engine 3. One end of the exhaust pipe 60 may be coupled to an exhaust pipe connection part 13 formed in the lamp housing 10 and connected to the exhaust hole part 50. The other end of the exhaust pipe 60 may be connected to the intake part 4.

A filter part 80 may include a filtering member 82 capable of filtering foreign matters and water contained in the air, and be arranged on the air discharge path formed by the exhaust pipe 60 and the exhaust pipe connection part 13. The filter part 80 may restrict the introduction of foreign matters and water into the exhaust pipe 60 and the engine 3, the foreign matters and water being contained in the air discharged to the outside of the lamp housing 10. Thus, the filter part 80 can prevent a blockage of the exhaust pipe 60 or damage or reduction in life time of the engine 3, which may be caused by the foreign matters and water.

The filter part 80 in accordance with the embodiment of the present invention may be installed at the boundary between the exhaust pipe connection part 13 and the exhaust pipe 60, but is not limited to the structure. The filter part 80 in accordance with the present embodiment may be installed at one of the exhaust pipe connection part 13 and the exhaust pipe 60, or a plurality of filter parts 80 may be installed at a plurality of spots.

Referring to FIGS. 1 and 2, the lamp 20 in accordance with the embodiment of the present invention may include a high beam 21, a low beam 22, and a turn indicator 23. The high beam 21 may serve to irradiate light to a long distance such that a driver can secure a field of vision, and have an angle facing upward in comparison to the low beam 22. The low beam 22 has an angle facing downward in comparison to the high beam 21 such that the eyes of a driver in a vehicle ahead or a vehicle traveling in the opposite direction are not dazzled. The turn indicator 23 may serve to inform surrounding drivers of a lane change to the left or right side. The turn indicator 23 may be positioned in the vehicle, unlike the structure illustrated in FIG. 4.

The low beam 22 may be positioned closer to the side surface of the vehicle than the high beam 21 such that the field of vision can be easily secured through the low beam 22. In embodiments, the low beam 22 may be arranged at the right side of the high beam 21 in the case of the right head lamp, and arranged at the left side of the high beam 21 in the case of the left head lamp. In embodiments, the low beam 22 may be positioned closer to the outside of the vehicle than the high beam 21.

During night driving, the state in which only the low beam 22 is turned on may be continuously maintained in normal cases. The high beam 21 may be restrictively used only when there are no vehicles around the corresponding vehicle, for example, when the vehicle travels on a quiet country road. Thus, the low beam 22 may generate a larger amount of heat than the high beam 21, and a temperature difference between the air around the low beam 22 and the atmosphere may be larger than a temperature difference between the air around the high beam 21 and the atmosphere. Therefore, moisture may mainly form on a part of the light transmitting lens 30, which faces the low beam 22.

The intake hole part 40 in accordance with the embodiment of the present invention may be positioned closer to the side surface of the vehicle than the low beam 22, and positioned at a higher level than the low beam 22. The exhaust hole part 50 may be positioned closer to the center of the vehicle than the high beam 21, and positioned at a lower level than the high beam 21. In embodiments, when the lamp 20 is applied to the right head lamp, the intake hole part 40 may be positioned at the right top of the low beam 22, and the exhaust hole part 50 may be positioned at the left bottom of the high beam 21.

As the intake hole part 40 is installed at the low beam 22, high-temperature dry air introduced into the lamp housing 10 through the intake hole part 40 may preferentially pass the low beam 22. Thus, the moisture forming on the light transmitting lens 30 due to a temperature difference between the low beam 22 and the atmosphere can be effectively removed. Furthermore, as air contains a large amount of moisture, the air sinks to a lower position than air containing a relatively small amount of moisture. Since the exhaust hole part 50 is formed at the bottom, the low-temperature damp air distributed at the bottom of the lamp housing 10 can be easily discharged to the outside of the lamp housing 10 through the exhaust hole part 50.

Figure 3:
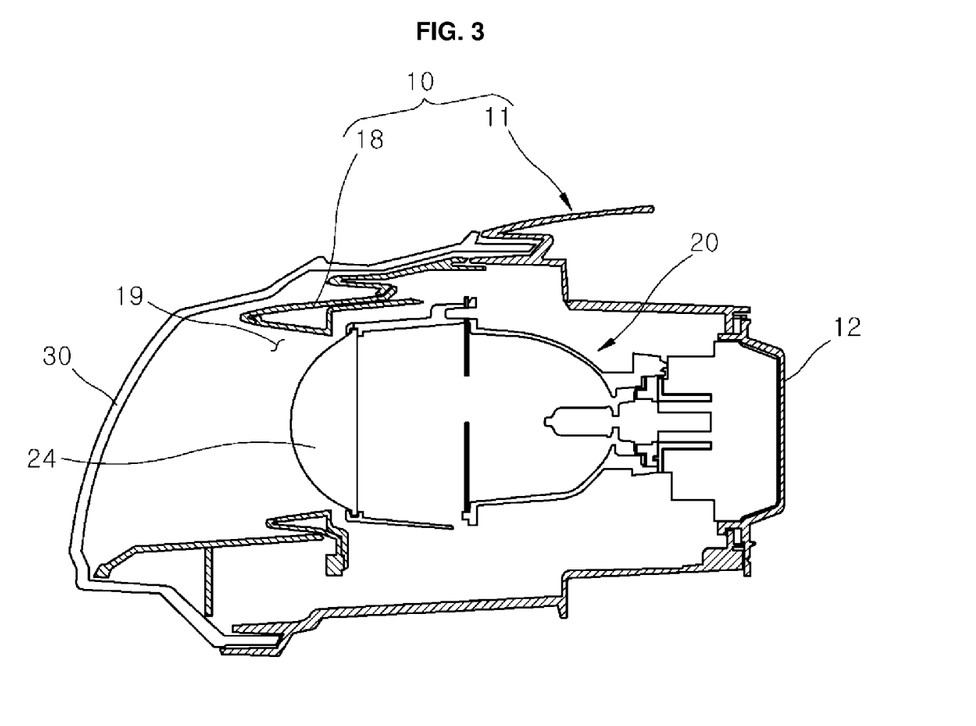
FIG. 3 is a schematic side cross-sectional view illustrating the ventilation apparatus of the lamp module for vehicles in accordance with the embodiment of the present invention.
Figure 4:
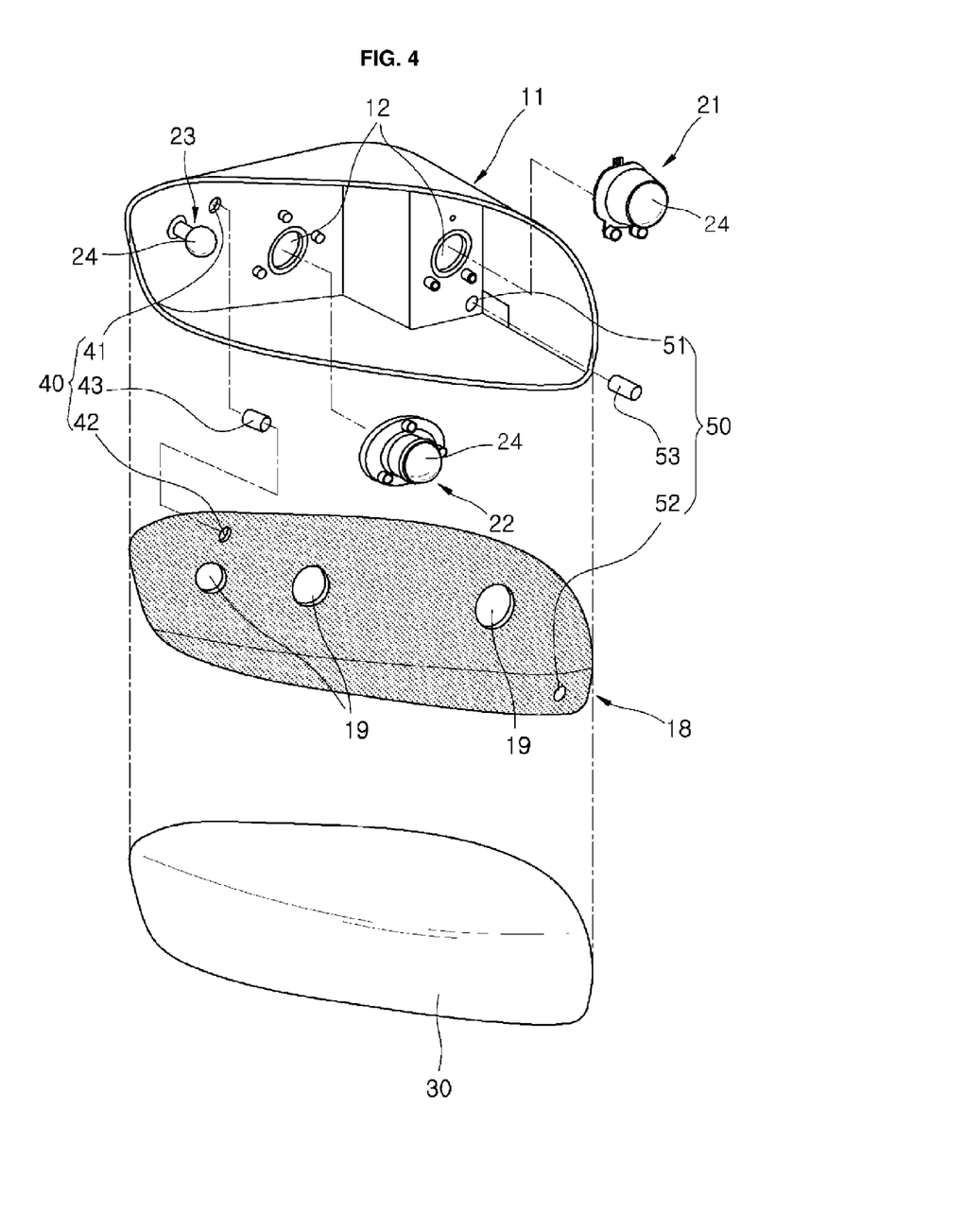
FIG. 4 is a schematic exploded perspective view illustrating the ventilation apparatus of the lamp module for vehicles in accordance with the embodiment of the present invention.

Referring to FIGS. 3 and 4, the lamp housing 10 in accordance with the embodiment of the present invention may include a housing body 11 and a base panel 18.

Figure 5:
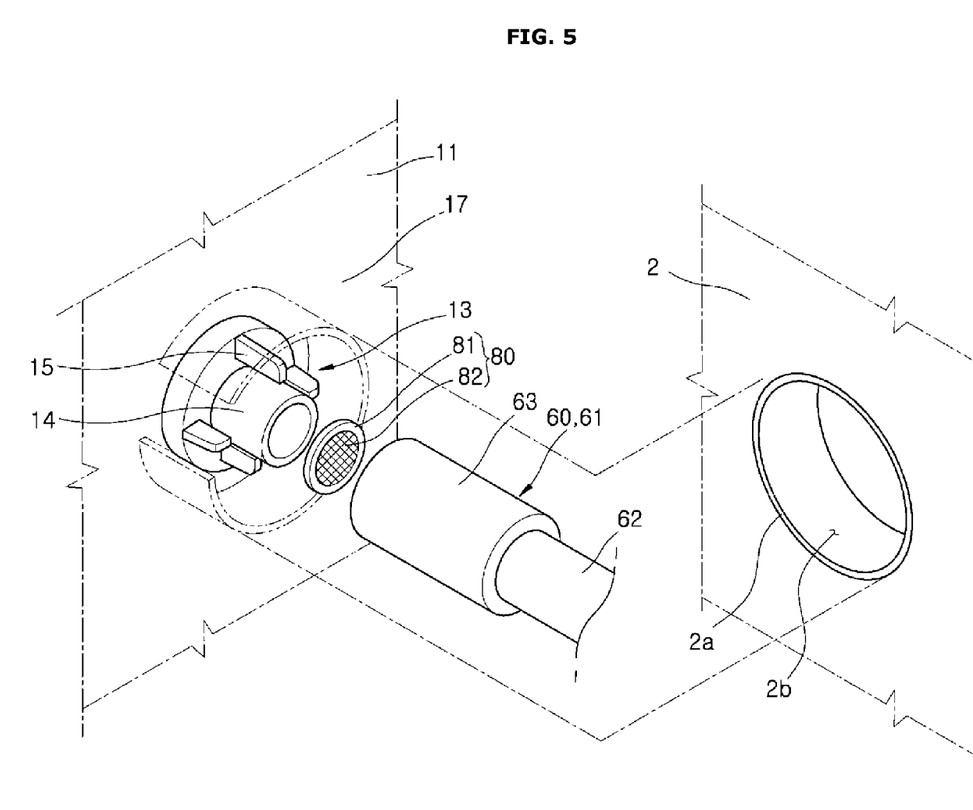
FIG. 5 is an exploded perspective view illustrating an assembling process for coupling an exhaust pipe to a housing body of the ventilation apparatus of the lamp module for vehicles in accordance with the embodiment of the present invention.

The housing body 11 may provide a mounting surface which can cover the lamp 20 from the rear side and on which the lamp 20 can be mounted. The housing body 11 may have a concave inner surface in which the lamp 20 can be housed, and have a shape opened to the front. Referring to FIGS. 4 and 5, the housing body 11 according to the present embodiment may include a lamp mounting part 12, an exhaust pipe connection part 13, and a mounting guide 17.

The lamp mounting part 12 may indicate a part of the housing body 11, on which the lamp 20 is mounted. The lamp mounting part 12 may have a hole structure through which the lamp 20 can be passed, or include a connection member such as a substrate or terminal, which can couple and support the lamp 20. The lamp 20 may be mounted on the lamp mounting part 12 so as to protrude forward.

The exhaust pipe connection part 13 may indicate a part of the housing body 11, to which the exhaust pipe 60 is connected. The exhaust pipe connection part 13 may be formed at the bottom of the outer surface of the housing body 11 so as to communicate with the exhaust hole part 50. Referring to FIGS. 4 and 5, the exhaust pipe connection part 13 in accordance with the present embodiment may include an exhaust pipe fitting part 14, a pressurizing part 15, and a water discharge part 16.

The exhaust pipe fitting part 14, to which the exhaust pipe 60 is fitted and coupled, may be formed on the housing body 11 so as to protrude in a pipe shape. The exhaust pipe fitting part 14 may have a flow path communicating with the exhaust hole part 50. The exhaust pipe 60 is fitted onto the circumference of the exhaust pipe fitting part 14 so as to communicate with the exhaust hole part 50.

The pressurizing part 15 may serve to pressurize the exhaust pipe 60 against the exhaust pipe fitting part 14. The plurality of pressurizing parts 15 may be arranged on the circumference of the exhaust pipe fitting part 14. The pressurizing part 15 may have a rib shape extended in the radial direction of the exhaust pipe fitting part 14, and protrude in the direction parallel to the exhaust pipe fitting part 14. The pressurizing parts 15 may be arranged at a preset distance from the exhaust pipe fitting part 14 such that the exhaust pipe 60 can be inserted between the pressurizing part 15 and the exhaust pipe fitting part 14.

When the pressurizing parts 15 are formed of an elastic material such as synthetic resin, the pressurizing parts 15 may elastically pressurize the exhaust pipe 60 toward the exhaust pipe fitting part 14 in a state where the exhaust pipe 60 is forced between the exhaust pipe fitting part 14 and the pressurizing parts 15. Through the pressurizing parts 15, the exhaust pipe 60 can be stably pressurized against the exhaust pipe fitting part 14, and the air of the exhaust pipe fitting part 14 can be stably passed to the exhaust pipe 60 without leakage.

Figure 6:
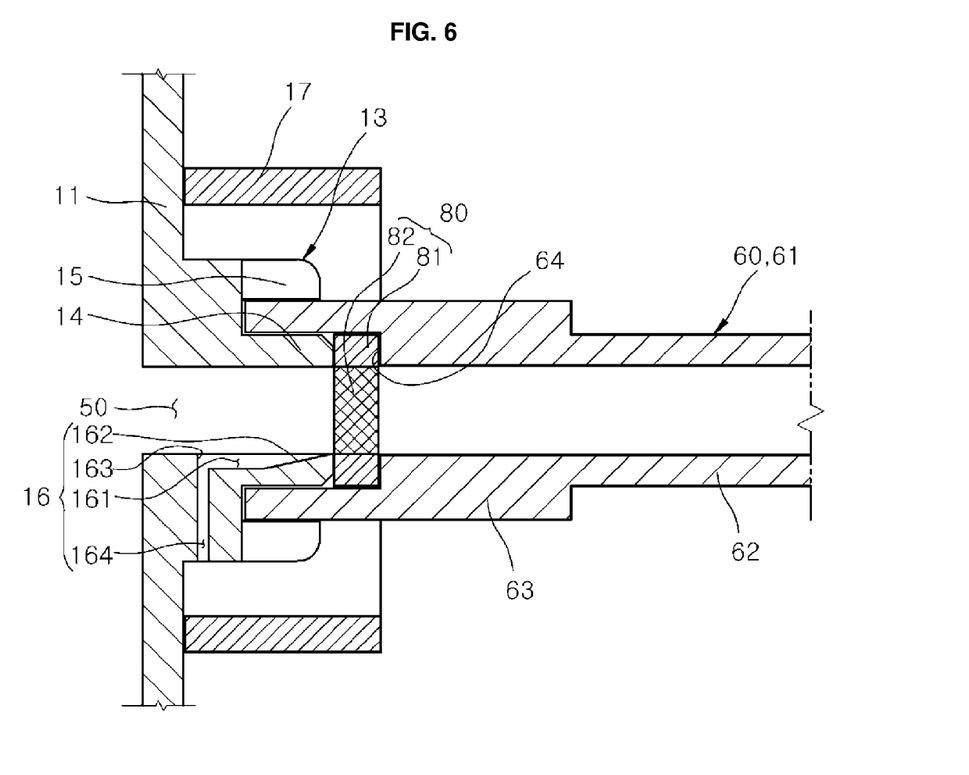
FIG. 6 is a cross-sectional view illustrating a connection part between the housing body and the exhaust pipe in the ventilation apparatus of the lamp module for vehicles in accordance with the embodiment of the present invention.

In accordance with the embodiment of the present invention, the filter part 80 may be installed between the exhaust pipe fitting part 14 and the exhaust pipe 60. The water discharge part 16 may form a flow path through which water, the water being filtered by the filter part 80 is discharged and restricted from flowing toward the exhaust pipe 60. The water discharge part 16 may be formed at the bottom of the exhaust pipe fitting part 14 so as to extend downward. Referring to FIG. 6, the water discharge part 16 in accordance with the embodiment of the present invention may include a container part 161, a guide inclined part 162, a leakage prevention bump 163, and a downward discharge part 164.

The container part 161 may be formed in a concave shape at the bottom of the inner surface of the exhaust pipe fitting part 14. The guide inclined part 162 may be formed at one side of the container part 161, which is close to the filter part 80, and inclined downward toward the container part 161 from the filter part 80. The leakage prevention bump 163 may be vertically formed at the other side of the container part 161, which faces the inner surface of the housing body 11, but have an inclined surface which is close to the filter part 80 toward the top. The downward discharge part 164 may form a flow path through which moisture can be passed, while being extended from the bottom of the container part 161 to the outer surface of the exhaust pipe fitting part 14.

The water filtered by the filter part 80 may be contained in the container part 161 along the guide inclined part 162 while flowing down along the filter part 80, and naturally discharged to the outside of the exhaust pipe fitting part 14 through the downward discharge part 164. At this time, the water contained in the guide inclined part 162 may be restricted from flowing to the inner surface portion of the housing body 11 by the leakage prevention bump 163 even when the vehicle is vibrated. Such an operation can stably prevent the introduction of water into the engine 3, and prevent the reduction in life time of the engine 3 due to the introduction of water.

Referring to FIG. 5, the mounting guide 17 may be inserted into an assembling part 2a formed in a carrier 2 of an FEM (Front End Module), and formed at the circumference of the exhaust pipe connection part 13. The mounting guide 17 may protrude in a direction parallel to the exhaust pipe connection part 13, and cover the exhaust pipe connection part 13 while being extended in a circular shape along the circumference of the exhaust pipe connection part 13. The assembling part 2a of the carrier 2 may have the shape of a groove or hole corresponding to the mounting guide 17 such that the mounting guide 17 can be inserted into the assembling part 2a. The assembling part 2a may have a through-hole 2b through which the exhaust pipe 60 can be passed.

The FEM may indicate a module in which front parts of the vehicle are modularized, in order to simplify the assembly process of the vehicle. In embodiments, the FEM may indicate a module in which a cooling module including a radiator and an air condenser, a bumper beam for distributing collision energy to left and right side members during a collision accident of the vehicle, and head lamps arranged at the left and right sides of the front of the vehicle are installed in the carrier 2.

When the mounting guide 17 is inserted into the assembling part 2a of the carrier 2, the lamp housing 10 may be arranged at a normal position on the carrier 2, and the exhaust pipe connection part 13 may be exposed at the rear side of the carrier 2 through the through-hole 2b. After the mounting guide 17 is inserted into the assembling part 2a of the carrier 2, the front end of the exhaust pipe 60 extended forward from the opening/closing valve 65 at the rear side of the carrier 2 can be easily coupled to the exhaust pipe connection part 13 through the through-hole 2b. Through such an assembling operation, the exhaust pipe 60 can be easily arranged at a normal position on the carrier 2.

The base panel 18 is a member which covers the parts of the lamp 20 excluding the light transmitting part 24 and the other parts installed in the housing body 11 in order to provide a neat exterior appearance of the vehicle and to smoothly reflect and transmit light. The base panel 18 may have a light transmitting hole 19 through which the light transmitting part 24 can be passed, and may be installed at the front of the housing body 11. The base panel 18 may include a reflecting plate and the like.

The base panel 18 may be coupled to the front surface of the housing body 11, and face the light transmitting lens 30. As the front surface of the base panel 18 is positioned closer to the light transmitting lens 30, a flow of air which sweeps the inner surface of the light transmitting lens 30 can be reliably formed. The base panel 18 according to the embodiment of the present invention may have a shape capable of covering the entire front surface of the housing body 11, but is not limited to a specific structure and shape. In embodiments, the base panel 18 may have the shape of covering a part of the housing body 11, for example.

Referring to FIG. 4, the intake hole part 40 in accordance with the embodiment of the present invention may include a first intake hole 41, a second intake hole 42, and an intake packing 43.

The first intake hole 41 is formed through the housing body 11. The second intake hole 42 may be formed through the base panel 18 so as to communicate with the first intake hole 41. The air outside the lamp housing 10 may be sequentially passed through the first and second intake holes 41 and 42 and then introduced between the base panel 18 and the light transmitting lens 30.

The intake packing 43 is a member for sealing the space between the first and second intake holes 41 and 42. The intake packing 43 may be formed of an elastic material such as rubber, and arranged between the first and second intake holes 41 and 42, while having a ring or pipe shape. As the space between the first and second intake holes 41 and 42 is sealed by the intake packing 43, the air introduced into the first intake hole 41 can be stably introduced to the front of the base panel 18 without leakage.

Referring to FIG. 4, the exhaust hole part 50 in accordance with the embodiment of the present invention may include a first exhaust hole 51, a second exhaust hole 52, and an exhaust packing 53.

The first exhaust hole 51 may be formed through the housing body 11. The second exhaust hole 52 may be formed through the base panel 18 so as to communicate with the first exhaust hole 51. The air between the base panel 18 and the light transmitting lens 30 may be sequentially passed through the second exhaust hole 52 and the first exhaust hole 51 and then discharged through the exhaust pipe connection part 13 and the exhaust pipe 60.

The exhaust packing 53 is a member for sealing the space between the first and second exhaust holes 51 and 52. The exhaust packing 53 may be formed of an elastic material such as rubber, and arranged between the first and second exhaust holes 51 and 52, while having a ring or pipe shape. As the space between the first and second exhaust holes 51 and 52 is sealed by the exhaust packing 53, the air inside the housing body 11, which is introduced into the second exhaust hole 52, can be stably passed to the exhaust pipe-60 without leakage.

Referring to FIG. 1, the exhaust pipe 60 in accordance with the embodiment of the present invention may include an extension pipe 61 and an opening/closing valve 65.

The extension pipe 61 may be arranged in the engine room 5, and extended from the housing body 11 to the intake part 4 of the engine 3. Referring to FIGS. 5 and 6, the extension pipe 61 in accordance with the embodiment of the present invention may include an extended pipe part 62, a reinforced pipe part 63, and an assembling stepped part 64.

The extended pipe part 62 may include a flow path through which air can be passed, and extend from the housing body 11 to the opening/closing valve 65. The reinforced pipe part 63 may be formed at the front end of the extended pipe part 62 coupled to the exhaust pipe connection part 13, and have a larger thickness than the extended pipe part 62. As the reinforced pipe part 63 is formed, the exhaust pipe 60 may be reliably coupled to the exhaust pipe connection part 13 without damage such as tear, even when the exhaust pipe 60 is formed of a flexible member such as rubber or plastic.

The assembling stepped part 64 may be formed at an inner-diameter part of the reinforced pipe part 63 so as to be in contact with the exhaust pipe fitting part 14 of the exhaust pipe connection part 13. As the assembling stepped part 64 is formed, an assembling force with the exhaust pipe fitting part 14 can be improved, and the movement of the filter part 80 arranged between the assembling stepped part 64 and the exhaust pipe fitting part 14 may be stably restricted.

The opening/closing valve 65 is a valve device for controlling the opening/closing of the extension pipe 61, and installed on the extension pipe 61. The operation of the opening/closing valve 65 may be controlled according to a switch operation signal of the driver. When the opening/closing valve 65 is opened in case of necessity, the air inside the housing body 11 may be forced to be discharged through the extension pipe 61.

Referring to FIGS. 5 and 6, the filter part 80 in accordance with the embodiment of the present invention may include a mounting frame 81 and a filtering member 82.

The mounting frame 81 may have a width and shape corresponding to the exhaust pipe fitting part 14 and the assembling stepped part 64, such that the two-way movement thereof can be restricted by the exhaust pipe fitting part 14 and the assembling stepped part 64. The filter part 80 may be stably installed between the assembling stepped part 64 and the exhaust pipe fitting part 14 through the mounting frame 81.

The filtering member 82 may serve to filter foreign materials and water contained in the air, and include a net and a sponge structure. The circumference of the filtering member 82 may be coupled to the mounting frame 81. While the air in the exhaust hole part 50 is passed through the filtering member 82, foreign materials and water contained the air may be filtered, and the purified air may be passed toward the exhaust pipe 60 and the engine 3. Thus, dust and water in the housing body 11 can be prevented from flowing into the exhaust pipe 60 and the engine 3.

Figure 7:
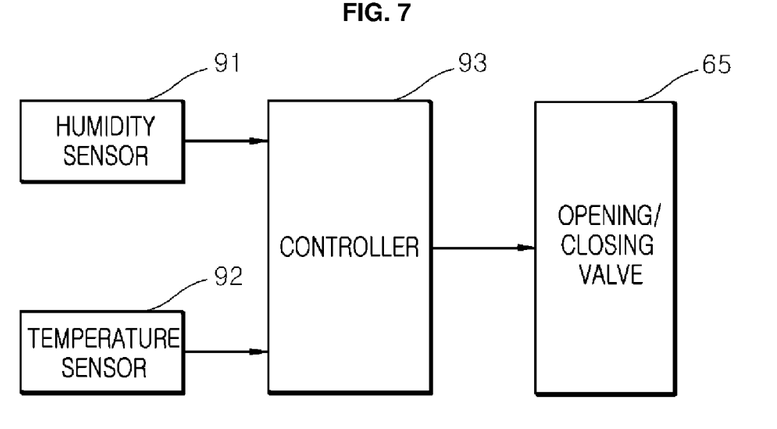
FIG. 7 is a conceptual view for describing the relationship among a humidity sensor, a temperature sensor, and a controller in the ventilation apparatus of the lamp module for vehicles in accordance with the embodiment of the present invention.

Referring to FIG. 7, the ventilation apparatus of the lamp module in accordance with the embodiment of the present invention may further include a humidity sensor 91 and a controller 93. The humidity sensor 91 may sense the humidity of the space between the lamp housing 10 and the light transmitting lens 30, and the controller 93 may control the operation of the opening/closing valve 65 according to the humidity measured by the humidity sensor 91.

The humidity sensor 91 may be installed in the lamp housing 10, and sense the humidity of the space between the lamp housing 10 and the light transmitting lens 30. When the humidity measured through the humidity sensor 91 is equal to or more than a preset value, the controller 93 receiving the humidity information may operate the opening/closing valve 65 to discharge the air in the space between the lamp housing 10 and the light transmitting lens 30. The preset value may indicate a humidity value at which moisture starts to form on the light transmitting lens 30.

Thus, the moisture in the space between the lamp housing 10 and the light transmitting lens 30 can be automatically removed. The controller 93 may include an ECU (Electronic Control Unit) arranged in the vehicle.

Referring to FIG. 7, the ventilation apparatus of the lamp module in accordance with the embodiment of the present invention may further include a temperature sensor 92 and the controller 93. The temperature sensor 92 may sense the temperature of the space between the lamp housing 10 and the light transmitting lens 30, and the controller 93 may control the operation of the opening/closing valve 65 according to the temperature measured by the temperature sensor 92.

The temperature sensor 92 may be installed in the lamp housing 10, and sense the temperature of the space between the lamp housing 10 and the light transmitting lens 30. When the temperature measured through the temperature sensor 92 is equal to or more than a preset value, the controller 93 receiving the temperature information may operate the opening/closing valve 65 to discharge the air in the space between the lamp housing 10 and the light transmitting lens 30. The preset temperature value may indicate a temperature value which can maintain a temperature difference from the atmosphere within a preset range or prevent overheating of the lamp 20.

Thus, the overheating in the space between the lamp housing 10 and the light transmitting lens 30 can be automatically prevented, and the occurrence of moisture caused by a temperature difference from the atmosphere or the overheating of the lamp 20 can be prevented. The controller 93 may include an ECU arranged in the vehicle.

The ventilation apparatus 1 of the lamp module for vehicles in accordance with the embodiment of the present invention may ventilate and dry the space between the lamp housing 10 and the light transmitting lens 30 while humid air between the lamp housing 10 and the light transmitting lens 30 is discharged through the exhaust hole part 50 and dry air in the atmosphere is newly introduced through the intake hole part 40, which makes it possible to effectively prevent the formation of moisture on the light transmitting lens 30.

Furthermore, since the space between the lamp housing 10 and the light transmitting lens 30 is maintained at the atmosphere by the intake hole part 40, vacuum pressure is not applied to the exhaust pipe 60 even though the air between the lamp housing 10 and the light transmitting lens 30 is discharged through the exhaust pipe 60. Thus, although the exhaust pipe 60 is formed of a flexible material, the exhaust pipe 60 can be prevented from being bent or clogged. As the exhaust pipe 60 is formed of a flexible material, the exhaust pipe 60 can be easily extended to the intake part 4 of the engine 3 through the extra space in the engine room 5.

Furthermore, as the exhaust hole part 50 is connected to the intake part 4 of the engine 3 through the exhaust pipe 60, an intake device such as a pump does not need to be additionally installed in the limited space of the engine room 5, but the intake force of the engine 3 may be used as an operational force. Thus, the energy and space can be efficiently utilized.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A ventilation apparatus of a lamp module for vehicles, comprising:
   a lamp housing;
   a lamp installed in the lamp housing, and emitting light through a light transmitting part;
   a light transmitting lens covering an opening of the lamp housing, and transmitting the light emitted from the light transmitting part;
   an intake hole part formed through the lamp housing, and arranged at one side of the lamp;

an exhaust hole part formed through the lamp housing, and arranged at the other side of the lamp; and an exhaust pipe having one side coupled to the lamp housing and connected to the exhaust hole part and the other side connected to an intake part of an engine, wherein the intake hole part is arranged at a side surface of the vehicle based on the lamp, and positioned at a higher level than the lamp, and the exhaust hole part is arranged at the middle of the vehicle based on the lamp, and positioned at a lower level than the lamp.

2. The ventilation apparatus of claim 1, wherein the lamp comprises:

a high beam; and a low beam arranged closer to the side surface of the vehicle than the high beam, wherein the intake hole part is positioned closer to the side surface of the vehicle than the low beam, and the exhaust hole part is positioned closer to the middle of the vehicle than the high beam.

3. The ventilation apparatus of claim 2, wherein the intake hole part is positioned at a higher level than the low beam, and the exhaust hole part is positioned at a lower level than the high beam.

4. The ventilation apparatus of claim 1, wherein the lamp housing comprises:

a housing body including a lamp mounting part on which the lamp is mounted, and having an exhaust pipe connection part to which the exhaust pipe is connected, such that the exhaust pipe connection part communicates with the exhaust hole part; and a base panel including a light transmitting hole through which the light transmitting part is passed, installed on the housing body so as to cover the lamp, and facing the light transmitting lens.

5. The ventilation apparatus of claim 4, wherein the exhaust pipe connection part comprises:

an exhaust pipe fitting part which protrudes from the housing body and to which the exhaust pipe is fitted; and a pressurizing part arranged at the circumference of the exhaust pipe fitting part and pressurizing the exhaust pipe against the exhaust pipe fitting part.

6. The ventilation apparatus of claim 5, further comprising a filter part arranged on an air discharge path formed by the exhaust pipe and the exhaust pipe connection part, and filtering foreign matters and water which are contained in the air.

7. The ventilation apparatus of claim 6, wherein the exhaust pipe connection part further comprises a water discharge part forming a flow path through which the water filtered by the filter part is discharged.

8. The ventilation apparatus of claim 4, wherein the housing body comprises a mounting guide protruding in a direction parallel to the exhaust pipe connection part, extended along the circumference of the exhaust pipe connection part so as to cover the exhaust pipe connection part, and fitted to an assembling part formed in a carrier of a front end module of a vehicle.

9. The ventilation apparatus of claim 4, wherein the intake hole part comprises:

a first intake hole formed in the housing body; and a second intake hole formed in the base panel so as to communicate with the first intake hole, and the exhaust hole part comprises:

a first exhaust hole formed in the housing body; and a second exhaust hole formed in the base panel so as to communicate with the first exhaust hole.

10. The ventilation apparatus of claim 9, wherein the intake hole part further comprises an intake packing for sealing the space between the first intake hole and the second intake hole, and the exhaust hole part further comprises an exhaust packing for sealing the space between the first exhaust hole and the second exhaust hole.

11. The ventilation apparatus of claim 4, wherein the exhaust pipe comprises:

an extension pipe extended from the housing body to an intake part of the engine, and arranged in an engine room having the engine installed therein; and an opening/closing valve installed on the extension pipe and restricting opening/closing of the extended part.

12. The ventilation apparatus of claim 11, wherein the extension pipe comprises:

an extended pipe part extended from the housing body to the intake part of the engine;

a reinforced pipe part formed at an end of the extended pipe part and having a larger thickness than the extended pipe part; and an assembling stepped part formed at the inner diameter part of the reinforced pipe part and having the exhaust pipe connection part fitted thereto.

13. The ventilation apparatus of claim 4, further comprising:

a humidity sensor configured to sense the humidity of the space between the lamp housing and the light transmitting lens; and a controller configured to control the operation of the opening/closing valve according to the humidity measured by the humidity sensor.

14. The ventilation apparatus of claim 4, further comprising:

a temperature sensor configured to sense the temperature of the space between the lamp housing and the light transmitting lens; and a controller configured to control the operation of the opening/closing valve according to the temperature measured by the temperature sensor.

15. The ventilation apparatus of claim 1, wherein the exhaust pipe comprises a flexible hose.

* * * * *